United States Patent [19]

Lynn

[11] Patent Number: 5,425,563
[45] Date of Patent: Jun. 20, 1995

[54] HAND HELD GARDEN TOOL AND METHOD

[76] Inventor: Claudia S. Lynn, Rte. 1, Box 1427, Keswick, Va. 22947

[21] Appl. No.: 231,466

[22] Filed: Apr. 22, 1994

[51] Int. Cl.6 .................... A01B 1/16; A01D 7/02
[52] U.S. Cl. ......................... 294/50.6; 294/26; 294/57; 172/378
[58] Field of Search ............ 294/15, 25, 26, 50.6, 294/55.5, 57, 58; 172/371, 378

[56] References Cited

U.S. PATENT DOCUMENTS

| | | | |
|---|---|---|---|
| 1,836,545 | 12/1931 | Normand | 294/26 X |
| 2,278,610 | 4/1942 | Brownson et al. | 294/25 |
| 2,330,679 | 9/1943 | Church | 172/378 X |
| 2,623,772 | 12/1952 | Johnson | 294/26 |
| 2,710,571 | 6/1955 | Pfister | 294/55.5 X |
| 3,477,756 | 11/1969 | Castro | 294/25 X |
| 4,061,387 | 12/1977 | Lindbergh | 294/26 |

*Primary Examiner*—Dean J. Kramer
*Attorney, Agent, or Firm*—William E. Mouzavires

[57] ABSTRACT

A weeding or garden tool with a handle fitting comfortably in the palm and supported by the middle, fore and index fingers. The tool further includes one or more tines extending forwardly from the handle and a support on the tines for receiving the middle fingers so that the tines, in effect, form extensions of the outstretched hands.

3 Claims, 1 Drawing Sheet

HAND HELD GARDEN TOOL AND METHOD

OBJECTS AND SUMMARY OF INVENTION

The present invention relates to hand held garden or weeding tools and a method of weeding through use of the tool. The majority of hand held weeding tools are generally gripped on the handle protruding perpendicular from the rear of the tool. Tools of this kind can be tiresome to grip over periods of time.

An object of the present invention is to provide a novel and improved hand held garden weeder tool that is comfortable to hold and operate and will reduce hand fatigue.

Another object of the invention is to provide a novel and improved method of utilizing a hand tool for weeding or gardening.

Another object is to provide such a tool as described above and which can be economically manufactured for retail at low cost.

The preferred embodiment of this invention provides a weeding or garden tool with a handle fitting comfortably in the palm and supported by one or more of the middle, fore and index fingers. The tool further includes one or more tines extending forwardly from the handle and support means on the tines for receiving the fingers so that the tines, in effect, form extensions of the outstretched hands.

DRAWINGS

Other objects and advantages of this invention will be apparent from the following more detailed description taken in conjunction with the accompanying drawings in which.

DETAILED DESCRIPTION

Figure 1:
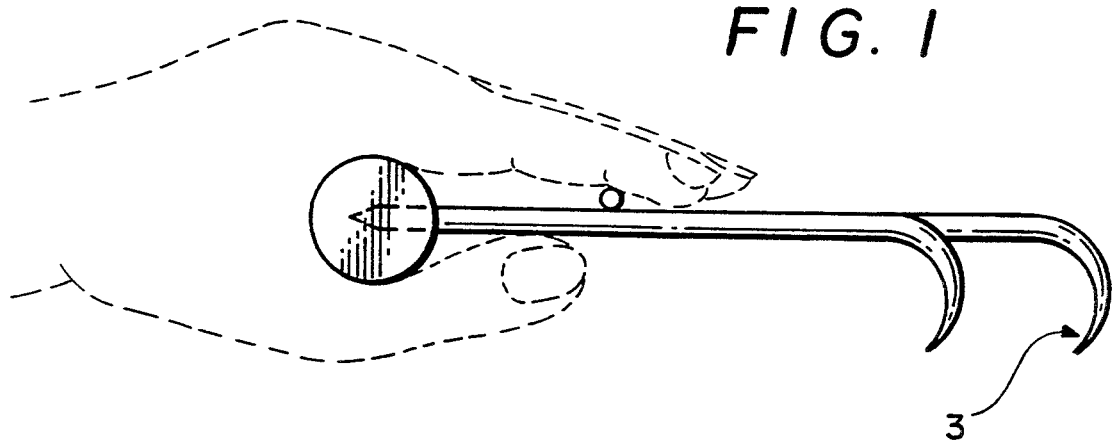
FIG. 1 is a side elevational view of a garden or weeding tool showing one method of holding or gripping the tool in the hand, the latter being shown in dotted lines.

Referring now to the drawings in detail there is shown for illustrative purposes only, a hand held garden or weeding tool including a handle that may have a cylindrical shape and sufficient length to extend transversely in the hand to be conveniently held as shown in FIG. 1. One or more but preferably three tines 7 are fixed to the handle and project therefrom in parallel and at right angles to the handle 1. In the preferred embodiment, the ends of the tines 7 are formed with hooks or claws extending downwardly for engaging and rooting out earth and weeds or other growths as may be desired. In addition, it is preferred that the middle tine 7a be longer than the outer tines and that the outer tines be of the same length and sufficiently spaced laterally from each other to enable support of several of the middle fingers as will be described below.

Figure 2:
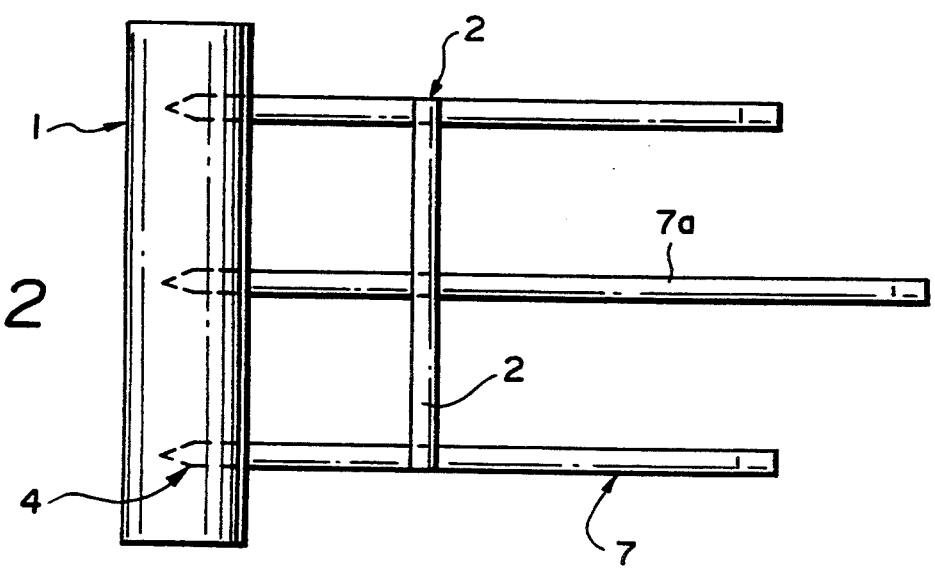
FIG. 2 is a top view of the weeding tool excluding the hand shown in FIG. 1.
Figure 3:
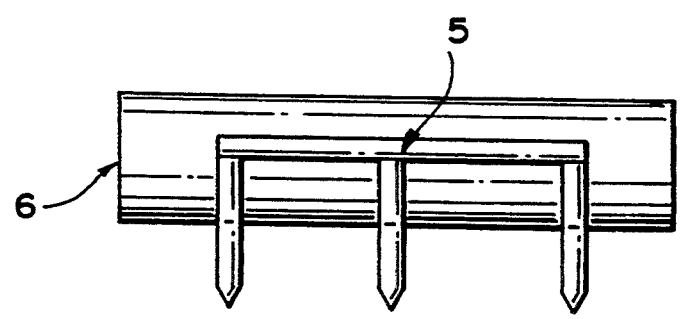
FIG. 3 is an end or front view of the tool.

In accordance with the invention, a finger support means 2 is provided on the tines 7 a predetermined distance from the handle 1 for receiving and supporting the fingers of the hand as shown in FIG. 1. It is preferred that the support be a rigid cross piece fixed to the tines 7, 7a in parallel to handle 1 as best shown in FIG. 2. Although the cross piece 2 is shown as a rod, other cross-sections or even planar or contoured pieces or plates may be employed instead.

The garden weeder is held loosely in the hand with the T-bar grip 1 resting in the palm. The reinforcing cross bar 2 being parallel to the T-bar grip 1 supports the extended index, fore and middle fingers which may rest on the bar 2 while the thumb underlies the handle. This simple arrangement allows the tool to become an extension of the hand. The cross bar 2 may be gripped when pulling or pushing the tool to apply needed force. The cross bar 2 may be attached to tines 5 by any reasonable means such as welding. The T-bar grip 1 may be made of wood, metal, plastic or some suitably durable material. The length of handle 1, diameter 6 and shape such as round or oval may vary to accommodate different size hands. The T-bar grip 1 or support 2 may or may not have some type of ridges, elevated grooves or contour to facilitate gripping or receipt of the fingers.

The cultivating or weeding tines 7 in this example may be made of a rigid material, for example, metal or plastic. Tines 7 may be secured to handle by any conventional means including but not limited to injection molding around them, spiked and driven 4, welded or glued to name but a few. Length and diameter of tines 7, 7a as well as the curvature a points of the claws 3 may be of various sizes to facilitate handling or a particular function.

The present invention may be applied to simple hand held garden tools such as cultivating tines (as shown), a spade, a fork or other hand held garden tools. Moreover, although a preferred embodiment of the invention has been shown and described, the invention need not be limited to such embodiment but rather the scope of the invention is defined in the appended claims.

I claim:

1. A method of gardening using a hand held tool having a handle extending in and across the palm of the hand, and at least one earth working element projecting forwardly from the handle, the method comprising the steps of: extending the thumb below the handle, stretching out and extending the fore, middle and index fingers over and forwardly of the handle and beyond a support on the earthworking element spaced forwardly of the handle, engaging with one or more of the middle fingers said support on the earth working element at a location spaced forwardly from the palm and generally at the finger joint adjacent the end of the finger, and working the tool while the figners are so stretched out and supported so that the tool acts as an extension of the stretched out fingers.

2. The method defined in claim 1 utilizing a support fixed across a plurality of tines spaced from the handle to support a plurality of the middle fingers.

3. The method defined in claim 1 including the step of supporting both middle fingers on said support at locations generally at the finger joints adjacent the ends of the fingers.

* * * * *